United States Patent Office 3,761,295
Patented Sept. 25, 1973

3,761,295
DIRECTIONALLY SOLIDIFIED REFRACTORY
OXIDE EUTECTIC
Charles O. Hulse, Manchester, and John A. Batt, Rockville, Conn., assignors to United Aircraft Corporation, East Hartford, Conn.
Filed Jan. 26, 1972, Ser. No. 220,908
Int. Cl. C04b 35/10, 35/48
U.S. Cl. 106—73.4     7 Claims

ABSTRACT OF THE DISCLOSURE

The eutectic composition exisiting between alumina and zirconia modified with a stabilizing agent such as yttria is directionally cast to provide a ceramic body of very high useful strength, the alumina matrix phase being prestressed in compression by the ordered phase of stabilized zirconia.

The invention herein was made in the course of a contract with the Department of the Navy.

BACKGROUND OF THE INVENTION

The present invention relates in general to the field of ceramic materials and, more particularly, to the refractory oxide eutectic materials as directionally cast.

As evidenced by the patent to Kraft 3,124,452, it is now well known that various eutectic compositions may, by directional solidification techniques, be cast into bodies displaying unique ordered microstructures and properties. With the metallic eutectics or eutectic-type alloys a number of particularly useful systems have been developed to take advantage of the ordered eutectic alloy microstructures in gas turbine engine hardware, including the aligned nickel-base alloys described in the patent to Thompson 3,554,817 and the aligned cobalt-base alloys of monovariant eutectic composition of Thompson et al. 3,564,940. Also of substantial utility are the skeletal or cellular microstructures mentioned in Lemkey et al. 3,552,953.

The metallic alloys are, however, typically limited in terms of their practical operating temperatures. To satisfy the increasing demand for gas turbine engine materials which will be strong at very high temperatures, attention has quite naturally been given to ceramics which, from the standpoint of their high temperature capabilities, easily surpass the bulk of the ceramics are generally so low that they are not usable in many important applications for which they might otherwise be well suited although some strides have been made leading to property improvements sufficient for use in some applications as discussed, for example, in the patent to Marshall et al. 3,181,939.

SUMMARY OF THE INVENTION

The present invention relates to a directionally solidified refractory oxide eutectic existing between alumina and zirconia wherein the zirconia has been stabilized in a cubic crystallographic structure, the alumina matrix is prestressed in compression at room temperature and the cast microstructure is ordered in a regular morphology.

In a preferred embodiment approximately 15 weight percent zirconia is replaced by yttria to provide the desired stabilization and prestressing. In this embodiment, the composition consists of about, by weight, 54.5 percent alumina with the balance zirconia and yttria.

DESCRIPTION OF THE PREFERRED EMBODIMENTS

Figure 1:
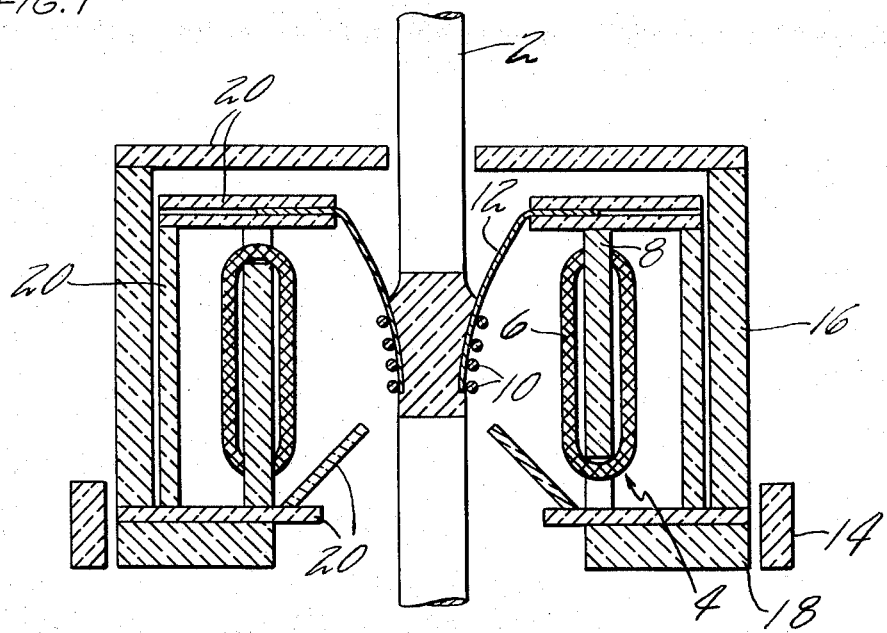
FIG. 1 is a schematic representation of the apparatus utilized for the zone melting of the refractory oxide eutectics of the present invention.

The main mechanism by which energy is absorbed during fracture of brittle materials is through the production of new surfaces and the fracture mechanism itself is generally believed to involve the sudden growth of very fine flaws which are always present in these materials. The importance of a particular flaw is dependent upon its size since fracture normally involves the growth of the "critical" flaw which is the largest microcrack with the appropriate orientation to the applied stress. Because in the typical bulk product the distribution of these flaws is random, the actual strengths of such bodies show a statistical distribution which is also a function of volume.

Extensive work in the hot-pressing of ceramics has demonstrated that significant increases in room temperature strength can be obtained by the fabrication of high density material with a very fine grain size to limit the size of the microcracks. Although hot-pressing can be an effective way to improve mechanical properties at low temperatures, grain growth normally occurs in the hot-pressed material after heating to high temperatures so that most of the benefits incident to the fine microstructure are lost.

In contrast to hot-pressed materials, the fine ordered microstructure of the directionally solidified eutectic is usually stable practically to the eutectic melting point. Thus, the fact that very fine microstructures which are stable to very high temperatures can be produced in ceramic systems constitutes a major advantage for the eutectic material over the more typical ceramic microstructures.

Furthermore, the presence of a finely dispersed high modulus ordered lamellar phase, either fibrous or cellular, in the directionally solidified eutectic can function to deviate cracks and deflect them along the ordered phase-matrix interfaces. It has been shown in the aligned eutectics that cracks are blunted and deflected along these interfaces rather than propagating in the usual brittle manner.

A number of other characteristics of the directionally solidified eutectic microstructure produce improvements in mechanical properties as compared to ceramic materials produced by other sophisticated means. For example, by appropriate selection of materials, an immediate possibility is that at high temperature the minor phase will have the high strength characteristics of a material in whisker form and that this phase will directionally reinforce the somewhat more ductile matrix in the typical fiber-reinforced composite manner.

The strength of the ceramic eutectic composite at lower temperatures, where both phases are brittle, is enhanced by selection of materials so that the matrix phase is placed in compression upon cooling due to differences in thermal expansion between the phases. In operation, then, a tensile stress applied to the bulk composite will not result in a tensile stress in the continuous matrix phase until the compression prestress has been overcome. If, in addition to the prestressing contribution, the combination provides a matrix with a lower elastic modulus than the reinforcing phase, the amount of stress seen by the matrix phase during tensile loading is even further reduced, since a proportionately larger fraction of the applied stress is carried by the minor phase as the ratio of the modulus of the reinforcing phase to the matrix phase increases. This latter contribution is not the case with the present system.

The present invention contemplates a directionally solidified ceramic eutectic composite, having the characteristics above described, between alumina and zirconia together with a stabilizing agent. The replacement, for example, of about 15 weight percent zirconia with yttria stabilizes the zirconia in the cubic structure and thereby effects prestressing of the alumina matrix in compression upon cooling for optimum properties. If the stabilizing agent is not added, the zirconia will not have a sufficiently high thermal expansion to prestress the alumina in compression upon cooling and it will undergo a monoclinic to tetragonal inversion resulting in very poor mechanical properties.

The composition of primary interest consists of about 54.5 weight percent alumina, balance zirconia plus stabilizing agent, which stabilizing agent may be yttria, calcia or, in fact, any other refractory material capable of providing the stabilizing function. Magnesia is also a commercially utilized stabilizing agent for zirconia.

Figure 2:
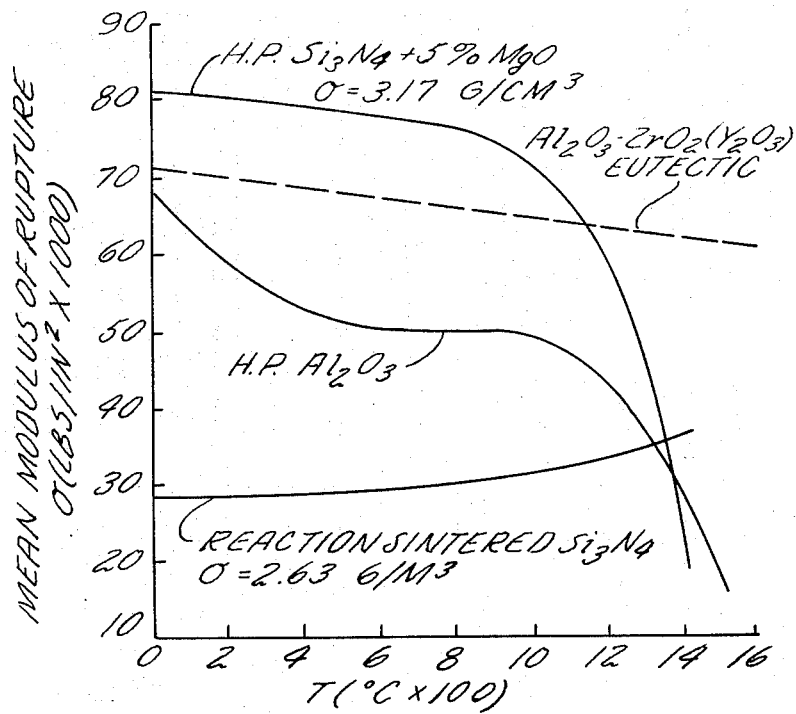
FIG. 2 is a graph comparing the mean modulus of rupture of the present invention with certain other ceramic materials.

In the particularly preferred alumina, zirconia, yttria combination the material melting point is about 3450° F. and, because of the very low vapor pressure of the component oxides, it is extremely stable even in high vacuum at its melting point. At a temperature of 2865° F. in air the directionally solidified material has demonstrated an average flexural strength of 61,500 lbs./in.$^2$ which is approximately fifty times the average strength of high quality commercial alumina tested under the same conditions. FIG. 2 compares the present eutectic with a number of known compositions at various temperatures. Both silicon nitride and silicon carbide which have potential for gas turbine engine usage are in fact somewhat temperature limited. They have a serious stability problem above about 2800° F. because of the volatility of the silicon dioxide coating which forms naturally on these materials by oxidation and which is protective below this temperature.

A number of ingots of the preferred composition were made and a variety of techniques were utilized. The principal apparatus used was that shown somewhat schematically in FIG. 1. Basically, the floating molten zone technique was utilized in an argon or vacuum atmosphere.

To minimize contamination to which processes of this type are somewhat susceptible, particularly in view of the very high temperatures involved, a billet or charge rod was made, not by premelting but by hydrostatically pressing well mixed powders into a ⅜ inch rod about 4 inches long. This rod comprised the basic charge 2.

Radiation heaters 4 comprising tungsten wires 6 wound upon slotted thoria tubes 8 provided the heat source. The typical heater consisted of about 19 inches of 20 mil wire and required 31 amps at 26 volts (800 watts) to melt a ⅜ inch diameter ½ inch long column of the eutectic. A liquid-solid thermal gradient of at least 1000° C./cm. was estimated using an optical pyrometer.

A wire basket 10 was in some cases used to support the melt and fix its position in the center of the heater. Although the melt could pass freely through the basket, surface tension forces kept the melt largely inside the basket helping to eliminate porosity in the directionally solidified ingots. The baskets were made from about four turns of tungsten or molybdenum wire spot welded to several support wires 12. The open basket allows dissolved gases to escape from the melt.

The remainder of the heater was made up from a combination of alumina tubes 14 and 16 and plates 18 which in turn provided the support for a series of heat shields 20 which were used to define the zone to be heated. Solidification was effected upwardly.

In an alternative scheme charge rods of the eutectic composition were slowly passed (0.5–10 cm./hr.) through a thin carbon ring susceptor acting as a line heat source in a radio frequency field.

It is known that the eutectic systems are somewhat sensitive to the conditions of solidification such as the solidification rate and the presence of impurities in the melt, although it is known that some additions are desirable and that the presence of a high liquid-solid thermal gradient may permit controlled anisotropic microstructures to be obtained at compositions quite far removed from the true eutectic compositions.

With respect to solidification rate, it has been shown that the rate selected may influence not only the degree of ordering but also the size and spacing of the minor phase in the cast article. With plane front growth in the present system the fiber-reinforced composite generally exhibits a substantial degree of minor phase fiber parallelism, typically at the slower solidification speeds. At the higher speeds, less minor phase fiber alignment or the cellular microstructure is exhibited.

The typical microstructures obtained have also shown that the cross-sectional geometry of the fibrous zirconia changes somewhat depending upon the degree of stabilization provided, the individual fibers becoming more lamellar when the eutectic is unstabilized and more filamentary when stabilized. As used herein the terms fibrous and lamellar have in context, when referring to the present invention, been used interchangeably. Whether aligned fibrous or cellular fibrous, the desired structure may be described as an ordered fibrous phase of regular morphology embedded in the matrix phase.

As previously noted, the replacement of a portion of the zirconia with a stabilizing agent is made to avoid the monoclinic to tetragonal inversion of the zirconia normally occurring at about 1800° F. and to stabilize the zirconia substantially in a cubic crystal structure. The replacement of 15 weight percent zirconia by yttria was made for this purpose. With this substitution the eutectic occurs at 54.5 weight percent alumina, 38.7 weight percent zirconia and 6.8 weight percent yttria. In the ternary system all compositions existing along the eutectic trough provide the desired ordered microstructure and the ternary trough in the alumina/zirconia/yttria system is oriented such that as the amount of stabilizer is changed, the alumina/zirconia ratio remains essenially constant.

From the foregoing it will be seen that now there has been provided a high temperature ceramic material of truly practical mechanical properties. Although the invention has been described in detail in connection with certain embodiments and examples, the invention in its broader aspects is not limited to the specific details shown and described but departures may be made therefrom within the scope of the appended claims without departing from the principles of the invention and without sacrificing its chief advantages.

What is claimed is:

1. A directionally solidified ceramic eutectic composite article comprising a matrix phase consisting essentially of alumina having embedded therein an ordered fibrous phase of regular morphology consisting essentially of stabilized zirconia, the matrix phase at room temperature being prestressed in compression by the ordered fibrous phase.

2. A directionally solidified ceramic eutectic composite article comprising a matrix phase consisting essentially of alumina having embedded therein an ordered fibrous phase of regular morphology consisting essentially of zirconia stabilized in a substantially cubic crystallographic structure by a refractory stabilizing agent, the matrix phase being prestressed in compression by the ordered fibrous phase.

3. A directionally solidified article according to claim 2 wherein the stabilizing agent is a refractory oxide selected from the group consisting of yttria and calcia.

4. A directionally solidified article according to claim 3 wherein the stabilizing agent comprises up to 15 weight percent refractory oxide on a substitution basis for zirconia.

5. A directionally solidified article according to claim 2 wherein the overall composition of the article consists essentially of about, by weight, 54–60 percent alumina, balance essentially zirconia plus stabilizing agent.

6. A directionally solidified ceramic eutectic article consisting essentially of, by weight, about 54–60 percent alumina, balance zirconia plus yttria, about 15 percent zirconia being substituted by the yttria, the yttria stabilizing the zirconia in a substantially cubic crystallographic structure, the article being characterized by an ordered microstructure wherein the stabilized zirconia is ordered in a regular morphology in a matrix phase consisting essentially of alumina, the zirconia prestressing the alumina in compression at room temperature.

7. An article according to claim 6 wherein the zirconia is in fibrous form in substantial alignment in the matrix.

References Cited

UNITED STATES PATENTS

| | | | |
|---|---|---|---|
| 2,079,101 | 5/1937 | Benner et al | 106—65 X |
| 3,679,383 | 7/1972 | Hack et al. | 106—57 X |
| 2,903,373 | 9/1959 | Sandmeyer | 106—57 |
| 3,124,452 | 3/1964 | Kraft | 75—135 |
| 1,658,659 | 2/1928 | Skaupy et al. | 106—42 X |
| 2,693,668 | 11/1954 | Slayter | 106—50 |
| 3,528,808 | 9/1970 | Lemkey et al. | 75—135 X |
| 3,181,939 | 5/1962 | Marshall | 51—309 |
| 3,542,541 | 11/1970 | Lemkey | 75—135 X |

HELEN M. McCARTHY, Primary Examiner

U.S. Cl. X.R.

23—301 SP; 51—309; 106—39.5, 57, 65; 161—169